United States Patent
Matsushita et al.

(10) Patent No.: US 7,644,860 B2
(45) Date of Patent: Jan. 12, 2010

(54) INFORMATION PROCESSING APPARATUS HAVING ILLEGAL ACCESS PREVENTION FUNCTION AND ILLEGAL ACCESS PREVENTION METHOD

(75) Inventors: Hisashi Matsushita, Osaka (JP); Hitoshi Yamada, Osaka (JP); Hidehito Okuda, Osaka (JP); Naoto Noguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 926 days.

(21) Appl. No.: 11/288,736

(22) Filed: Nov. 29, 2005

(65) Prior Publication Data
US 2006/0278701 A1    Dec. 14, 2006

(30) Foreign Application Priority Data
Jun. 10, 2005    (JP)    ............................ 2005-170633

(51) Int. Cl.
 *G06K 5/00*    (2006.01)
(52) U.S. Cl. ........................ 235/382; 235/380; 235/492; 713/183; 705/30
(58) Field of Classification Search ................. 235/382, 235/380, 492; 713/183; 340/5.6, 506; 705/30
See application file for complete search history.

(56) References Cited

U.S. PATENT DOCUMENTS

| 6,601,188 B1 * | 7/2003 | Wilding ........................ 714/15 |
| 7,159,120 B2 * | 1/2007 | Muratov et al. ............. 713/182 |
| 7,489,923 B2 * | 2/2009 | Varanda ...................... 455/418 |
| 2003/0142346 A1 * | 7/2003 | Shirotori et al. ............ 358/1.15 |
| 2004/0124975 A1 * | 7/2004 | Fujiwara et al. ............. 340/506 |
| 2005/0005131 A1 * | 1/2005 | Yoshida et al. .............. 713/183 |
| 2005/0044014 A1 * | 2/2005 | Tilis et al. ...................... 705/30 |
| 2005/0211782 A1 * | 9/2005 | Martin et al. .......... 235/462.45 |
| 2008/0211624 A1 * | 9/2008 | Micali et al. ................. 340/5.6 |

FOREIGN PATENT DOCUMENTS

| JP | 11-259369 | 9/1999 |
| JP | 2000-078127 | 3/2000 |
| JP | 2001-027911 | 1/2001 |

* cited by examiner

*Primary Examiner*—Allyson N Trail
(74) *Attorney, Agent, or Firm*—RatnerPrestia

(57) ABSTRACT

An information processing apparatus includes a first recording medium, a password input unit, a password judging unit, and a condition judging unit. The first recording medium is capable of recording programs and data. The password input unit requests a user to input a password. The password judging unit judges whether a password inputted to the password input unit and a password stored in advance coincide with each other. The condition judging unit judges, when the apparatus is started, whether a condition set in advance is satisfied. When the condition set in advance is satisfied, the information processing apparatus sets a self-erasing program in the first recording medium. The first recording medium self-erases programs and data recorded in the first recording medium according to the self-erasing program.

4 Claims, 5 Drawing Sheets

INFORMATION PROCESSING APPARATUS HAVING ILLEGAL ACCESS PREVENTION FUNCTION AND ILLEGAL ACCESS PREVENTION METHOD

BACKGROUND OF THE INVENTION

1. Field of the Invention

The present invention relates to an information processing apparatus such as a personal computer (hereinafter referred to as PC) having an illegal access prevention function and an illegal access prevention method for the information processing apparatus.

2. Description of the Related Art

In recent years, portable information processing apparatuses such as notebook PCs have been widely spread to the public and people can easily carry the information processing apparatuses outside. On the other hand, a large number of incidents such as the theft of the information processing apparatuses and the leakage of information recorded in the information processing apparatuses occur. This is considered a social problem. It is known that, to tackle such a problem, in general, recent PCs are added with an illegal access prevention function (also referred to as security function).

For example, in order to prevent an illegal access to a PC, a user is requested to input a password in starting the PC. When an inputted password does not coincide with a password registered in advance, an operating system (hereinafter referred to as OS) does not start and rejects start of the PC itself. In addition, when the user accesses individual information, the operating system judges whether a password is right. However, since the password consists of alphanumeric characters or signs of fixed digits, if passwords are repeatedly inputted while changing alphanumeric characters, a password could coincide with a correct password sooner or later. Therefore, it is likely that a password is decoded even if a password judgment function is simply provided. It could be difficult to effectively prevent an illegal access to individual information.

FIG. 6 is a flowchart of an operation of a conventional illegal access prevention system for a computer disclosed in Japanese Patent Unexamined Publication No. 2001-27911. A constitution of the conventional illegal access prevention system is not shown in a figure.

First, a user turns on a power supply of a PC (S601). Before starting an OS, a password confirmation processing unit of the PC causes a display device to display a password input screen and urges the user to input a password (S602). The user inputs a password from a keyboard serving as an input/output device. If the user inputs the password from the keyboard in response to the input request, the password confirmation processing unit compares the password inputted with a password set in advance (S603). When the inputted password is illegal (No in S603), the password confirmation processing unit displays a warning message on the display device (S604) and counts up a counter for counting the number of times of display of the warning message.

If the number of times of display of the warning message is equal to or less than two times, the password confirmation processing unit returns the processing to S602 (S606) and urges the user to input a password again. Alternatively, when the inputted password is a third illegal password inputted from the keyboard in S606, the password confirmation processing unit turns off the power supply of the PC (S607). When the password inputted in S603 coincides with the password set in advance (Yes in S603), the password confirmation processing unit starts the OS and permits an access to the PC (S605).

As explained above, it is possible to prevent an illegal access to the computer, which the OS cannot prevent, at a stage of power supply to the PC. This makes it possible to use the OS in safety without concern about copy or deletion of a file by an illegal user. In a state in which a medium, for example, a hard disk drive (hereinafter referred to as HDD) having data recorded therein is mounted on an apparatus such as a PC, once a password is set on this PC, a power supply is turned off when input of a password is tried a plural times unless the correct password is inputted. As a result, it is certainly difficult to read out a content in the medium.

In a constitution disclosed in Japanese Patent Unexamined Publication No. H11-259369, passwords are compared when an information processing apparatus is started. When it is judged that a trial for an illegal access such as input of a wrong password is performed, a program in a flash memory such as a Basic Input/Output System (hereinafter referred to as BIOS) is rewritten. Consequently, a value as the information processing apparatus is reduced and a content of a secondary storage device such as an HDD is destroyed to prevent the leakage of information. When a correct password is not inputted within a predetermined number of times of input, a program and data desired to be read out are erased by a mainframe such as a PC. This is stronger against an illegal access.

In a constitution disclosed in Japanese Patent Unexamined Publication No. 2000-78127, as an illegal writing prevention method of preventing illegal writing in an individual information area of a memory built in a radio selective calling receiver, a password for allowing an access to the individual information area is stored in the memory. Coincidence/non-coincidence of an inputted password and a stored password is judged and the number of times of non-coincidence is counted by a counter. When the number of times of non-coincidence exceeds a predetermined value, information in a predetermined portion of the memory is erased to make it impossible to write information in the individual information area after that. When a correct password is not inputted within a predetermined number of times, a program and data desired to be read out are erased by a mainframe such as a PC. This is strong against an illegal access as in the example described above.

However, in the constitution disclosed in Japanese Patent Unexamined Publication No. 2001-27911, although the power supply is turned off when input of a password is tried a plural time, it is possible to decode a password through trial of a finite number of times. When the password is decoded, it is still possible to illegally read out data recorded in the HDD with a method of, for example, starting the OS from another device when the PC is started.

In the constitution disclosed in Japanese Patent Unexamined Publication No. H11-259369, even if erasure of the HDD is started, it is possible to illegally readout data recorded in the HDD with a method of, for example, forcibly turning off the power supply of the PC and subsequently decoding a password with the same method as described above or taking out the HDD and connecting the HDD to another PC. Similarly, in Japanese Patent Unexamined Publication No. 2000-78127, it is possible to illegally read out data recorded in the HDD with a method of, for example, taking out the HDD and connecting the HDD to another PC.

SUMMARY OF THE INVENTION

An information processing apparatus according to the invention includes a first recording medium, a password input unit, a password judging unit, and a condition judging unit. The first recording medium is capable of recording programs and data. The first recording medium is, for example, HDD 106 in FIG. 1. The password input unit is an input unit to which a user inputs a password. The password input unit is, for example, keyboard 113 in FIG. 1. The password judging unit judges whether a password inputted to the password input unit and a password stored in advance coincide with each other. The password judging unit is constituted by, for example, Central Processing Unit (hereinafter referred to as CPU) 102 and flash memory 108 in FIG. 1. The condition judging unit judges, when the apparatus is started, whether a condition set in advance is satisfied. The condition judging unit is constituted by, for example, CPU 102 and flash memory 108 in FIG. 1. When the condition judging unit judges that the condition set in advance is satisfied, the information processing apparatus sets a self-erasing program in the first recording medium. The first recording medium self-erases programs and data recorded in the first recording medium according to the self-erasing program. This makes it possible to prevent an illegal access and reinforce security by erasing the programs and the data with the self-erasing program when the condition set in advance is satisfied.

In the information processing apparatus of the invention, the self-erasing program once set in the first recording medium is constituted to be nonvolatile. The information processing apparatus may be constituted such that, even if an erasing operation of the self-erasing program is forcibly suspended, the self-erasing program may be executed again when the apparatus is started next time. According to this constitution, it is possible to more surely erase the programs and the data recorded in the first recording medium, prevent an illegal access more strongly, and reinforce security.

The information processing apparatus of the invention may be constituted such that the condition set in advance is a condition that, when the apparatus is started, the password judging unit judges whether a password inputted to the password input unit coincides with a password stored in advance and, when the passwords do not coincide with each other, the password input unit requests a user to input a password again, and wrong input is performed for a predetermined time. According to this constitution, it is possible to prevent an illegal access of repeatedly inputting passwords while changing alphanumeric characters and reinforce security.

The information processing apparatus of the invention may be constituted to further include a clock and a second recording medium. The clock outputs time data. The clock is, for example, real time clock (hereinafter referred to as RTC) 112 in FIG. 1. The second recording medium records an operation end time of the apparatus obtained by using the clock. The second recording medium is, for example, CMOS memory 109 in FIG. 1. The condition set in advance may be a case in which a time difference between a start time when the apparatus is started and a previous operation end time recorded in the second recording medium exceeds a predetermined time. According to this constitution, when a state in which the apparatus is not used exceeds a predetermined time, it is possible to self-erase the programs and the data recorded in the first recording medium judging that the apparatus is stolen, prevent an illegal access, and reinforce security.

An illegal access prevention method of the invention is an illegal access prevention method for an information processing apparatus including a first recording medium capable of recording programs and data. The illegal access prevention method includes a password input step, a password judging step, a condition judging step, and a self-erasing step. The password input step is a step of requesting a user to input a password. The password judging step is a step of judging whether a password inputted in the password input step and a password stored in advance coincide with each other. The condition judging step is a step of judging, when the information processing apparatus is started, whether a condition set in advance is satisfied. The self-erasing step is a step of setting, when it is judged in the condition judging step that the condition set in advance is satisfied, a self-erasing program in the first recording medium and self-erasing programs and data recorded in the first recording medium according to the self-erasing program. This makes it possible to realize prevention of an illegal access to the information processing apparatus and reinforce security by self-erasing the programs and the data in the first recording medium to thereby make prevention of data leakage from the first recording medium due to an illegal access stronger.

DETAILED DESCRIPTION OF THE PREFERRED EMBODIMENTS

Embodiments of the invention will be hereinafter explained with reference to the accompanying drawings.

First Embodiment

Figure 1:
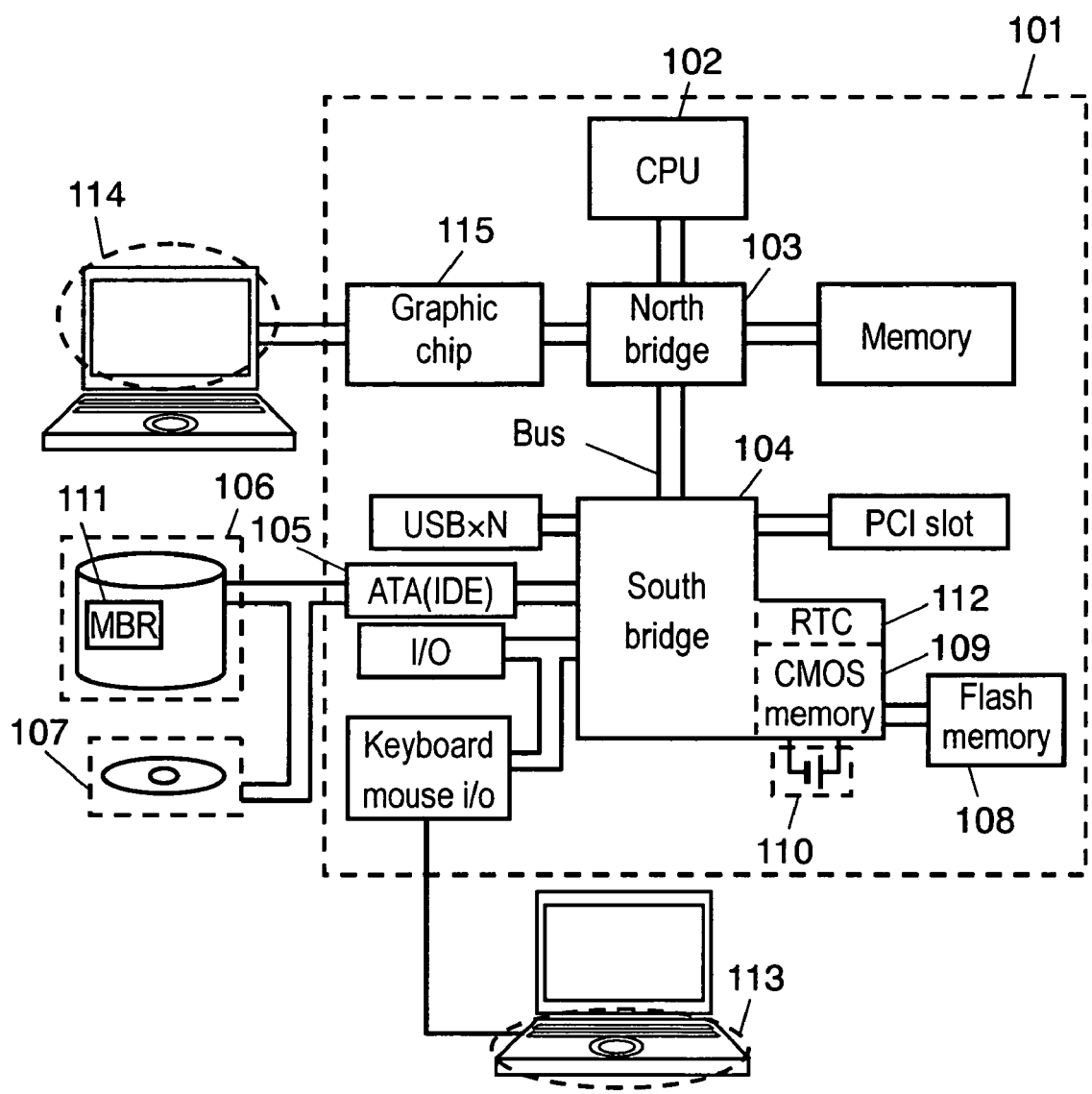
FIG. 1 is a hardware configuration diagram of an information processing apparatus in a first embodiment of the invention.

FIG. 1 is a hardware configuration diagram of a PC that is an information processing apparatus in a first embodiment of the invention.

In FIG. 1, the PC includes motherboard 101, central processing unit 102, north bridge 103, south bridge 104, Advanced Technology Attachment (ATA) (Integrated Drive Electronics (IDE)) interface 105, HDD 106, CD/DVD drive 107, flash memory 108, coin battery 110, keyboard 113, and liquid crystal display 114.

Motherboard 101 is a component for fixing or mounting main components constituting the PC. CPU 102 controls components of the PC. North bridge 103 is called a chip set and controls data flowing between CPU 102 and a memory or a graphic chip. South bridge 104 is also called a chip set and performs control for data flowing among ATA (IDE) interface 105 connecting HDD 106 and CD/DVD drive 107, interfaces for keyboard 113 and a mouse (not shown), Peripheral Component Interconnect (PCI) slots for an extension card (Local Area Network (LAN) card) and a sound card, and other interfaces.

Flash memory 108 is nonvolatile and includes a program group called BIOS. The BIOS controls disks such as HDD 106, CD/DVD 107, and a Floppy Disk Drive (FDD, not shown) and devices such as keyboard 113 and graphic chip 115. The BIOS can invoke a setup menu when a user presses a predetermined key immediately after starting the PC and change a set content. The set content is stored in CMOS memory 109 in a CMOS memory area in south bridge 104 and backed up by coin battery 110. Thus, the set content is held and never disappears even if a power supply is turned off. Liquid crystal display 114 displays characters, figures, and the like according to control of graphic chip 115.

An illegal access prevention operation of the PC serving as the information processing apparatus constituted as described above will be explained with reference to FIGS. 2A to 2E. FIGS. 2A to 2E are diagrams showing screens in respective states in the information processing apparatus in this embodiment.

Figure 2A:
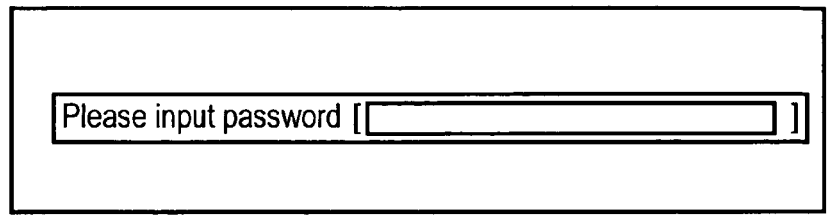
FIG. 2A is a diagram showing an input screen of a password in the information processing apparatus in the embodiment.

For illegal access prevention, a password input request is set when the PC is started. FIG. 2A is an input screen for a password in the information processing apparatus in this embodiment. When a correct password is inputted and collation of the password with a password recorded in advance is successful, Mater Boot Record (hereinafter referred to as MBR) 111 is read. MBR 111 is placed at the top of a hard disk. Information such as a method of starting an OS stored in the hard disk is recorded in MBR 111.

When MBR 111 is read, a program called a boot loader (not shown) operates. The boot loader reads a partition table in which positions, sizes, and the like of areas in the hard disk are recorded and reads an area called a boot sector of a partition to be started. A program placed in the boot selector starts the OS placed in the partition.

Figure 2B:
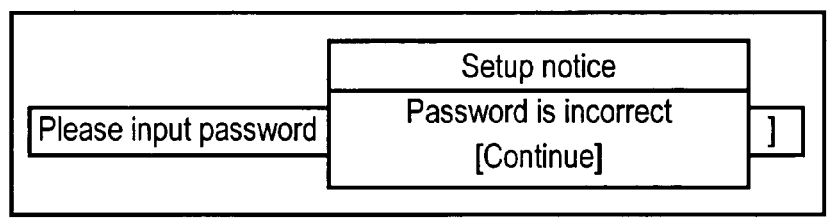
FIG. 2B is a diagram showing a password input screen for urging a user to input a correct password again in the information processing apparatus in the embodiment.

On the other hand, when a correct password is not inputted, as shown in FIG. 2B, a message "Password is not correct" is outputted to a screen and the operation described above is not performed. When a correct password is not set for a predetermined number of times, this is recognized as an illegal access to the PC, a security function is activated, and an operation described below is performed. In this embodiment, the operation for repeating display of the screens in FIGS. 2A and 2B is performed until wrong password input is performed three times. In an example in FIG. 2C, a message "Password is not correct. Please make contact with system administrator." is outputted to a screen when wrong password input is performed for the fourth time. The operation for repeating display of the screens in FIGS. 2A and 2B is not performed.

Figure 2C:
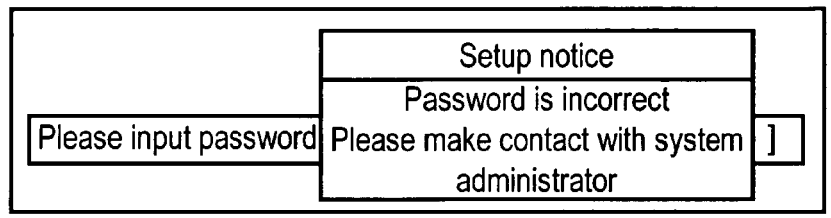
FIG. 2C is a diagram showing a screen in the case in which wrong input of a password is performed for a predetermined number of times or more in the information processing apparatus in the embodiment.
Figure 2D:
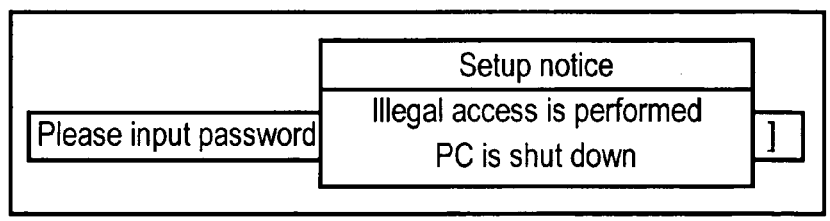
FIG. 2D is a diagram showing another screen in the case in which wrong input of a password is performed or the predetermined number of times or more in the information processing apparatus in the embodiment.
Figure 2E:
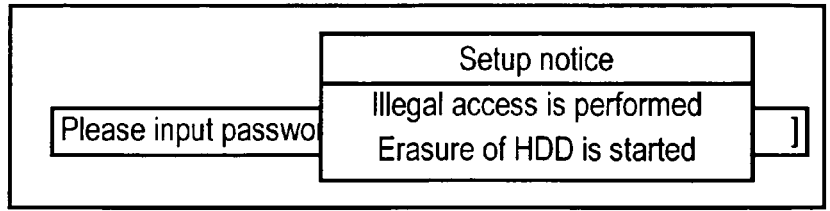
FIG. 2E is a diagram of a screen showing activation of an HDD self-erasing function in the information processing apparatus in the embodiment.

After a while, the message in FIG. 2C changes to a message in FIG. 2D "Illegal access is performed. PC is shut down." and, simultaneously, a power supply automatically enters a shutdown mode. After the shut down, when the PC is started again (for the fifth time) and a wrong password is inputted, MBR 111 in target HDD 106 is written to control start of the OS. The auto-erasing program is set in MBR 111 and a message such as "Illegal access is performed. Erasure of HDD is started." in FIG. 2E indicating activation of the HDD self-erasing function is displayed to automatically perform restart of the PC, that is, hardware reset and start erasure of programs and data in the entire HDD. A recovery area for returning HDD 106 to the same state as at the time of shipment from a factory is also present on HDD 106. Programs and data including the recovery area are completely erased.

Even if the power supply is turned off during erasure, the BIOS memorizes that the self-erasing program is activated and controls use of all user interfaces including start from other devices such as an FDD and password input such that the PC is started only from the HDD. Consequently, the self-erasing program is executed through rewritten MBR 111 to continue to erase the content of HDD 106. After the self-erasure program is activated, the user interfaces are controlled to be unusable. This makes it impossible to enter BIOS setup and operate a start order.

In the examples in FIGS. 2A to 2E, the operation for repeating display of the screens in FIGS. 2A and 2B is performed until a correct password is not inputted three times. When incorrect password input is performed for the fourth time, a warning is displayed. When incorrect password input is performed for the fifth time, the HDD self-erasure is activated. These numbers of times are changeable according to user setting by the BIOS.

In this embodiment, the HDD self-erasure is activated in the following cases.

(a) Wrong password input is performed for the predetermined number of times when the PC is started. A PC administrator can set the predetermined number of times and validity/invalidity of the HDD self-erasing function itself.

(b) After return from an inactive state, a password for the BIOS is also asked to set the password as an object of the HDD self-erasure activation condition.

(c) A password for entering the BIOS setup is also set as an object of the HDD self-erasure activation condition.

(d) When a password is not inputted, the PC is shutdown after a predetermined time elapses. In this case, the predetermined number of times is not counted.

As described above, according to this embodiment, When the HDD self-erasure activation is performed because of an illegal access, the programs and the data recorded in the HDD is self-erased. In addition, once the self-erasure activation is performed, even if the power supply is turned off during erasure, the self-erasing program in the HDD is always started from the HDD next time and continues HDD erasure. In that case, start of the PC from the other devices such as the FDD and use of the user interfaces are also controlled. Since the user interfaces are also controlled, that is, made unusable, it is not allowed to enter the BIOS setup and operate a start order. Security is reinforced by erasing all the programs and the data in the HDD. This makes it possible to make prevention of data leakage from a recording medium such as the HDD due to an illegal access stronger.

Time when self-erasure of the HDD is activated may be recorded in MBR 111 as evidence. The self-erasing program of MBR 111 may be set to display, for example, a message "HDD is being erased." during erasure and display a message "HDD is completely erased." after the end of the erasure on the liquid crystal display 114. After the end of the erasure, even when the power supply is turned off and turned on again in a state in which the message is displayed, the devices other than the HDD are not started. Subsequently, the self-erasing program of MBR 111 is executed and the messages during erasure and after the end of the erasure are displayed. The messages are not limited to display but may be messages in sound.

Since the BIOS memorizes that self-erasure of HDD 106 is activated. Thus, even if the PC is started in a state in which HDD 106 is removed, the BIOS may detect absence of HDD 106 and shut down the PC. Even if HDD 106 is replaced with another HDD (not shown) in this state, if the self-erasing program is reset in the HDD by the BIOS to perform self-erasure of the HDD, it is possible to limit reuse of the PC itself in addition to prevention of data leakage from HDD 106.

As described above, since use of the user interfaces is also prohibited, it is impossible to enter the BIOS setup and operate a start order. In addition, in the examples in FIGS. 2A to 2E, the operation for repeating display of the screens in FIGS. 2A and 2B is performed until a correct password is not inputted three times. When incorrect password input is performed for the fourth time, a warning is displayed. When incorrect password input is performed for the fifth time, the HDD self-erasure is activated. These numbers of times of allowance of wrong input are changeable according to user setting by the BIOS.

In this case, it is also possible that a warning sound is emitted at the time of wrong input of a password and a frequency, a tone, and a volume of the sound are changed according to the number of times. It is desirable that a password includes a predetermined number or more of characters when the password is set and make it difficult to guess the password by complicatedly combining as many types of characters as possible. Setting of validity/invalidity of the self-erasing function itself of the HDD may be changed.

In this embodiment, the PC serving as the information processing apparatus and the HDD built in the PC are mainly explained. However, the information processing apparatus is not limited to the PC but may be a Personal Digital Assistant (PDA), a game machine, and an HDD integrated DVD recorder. The recording medium is not limited to the HDD but may be a rewritable recording medium such as a semiconductor memory and a recording DVD.

Second Embodiment

Figure 3:
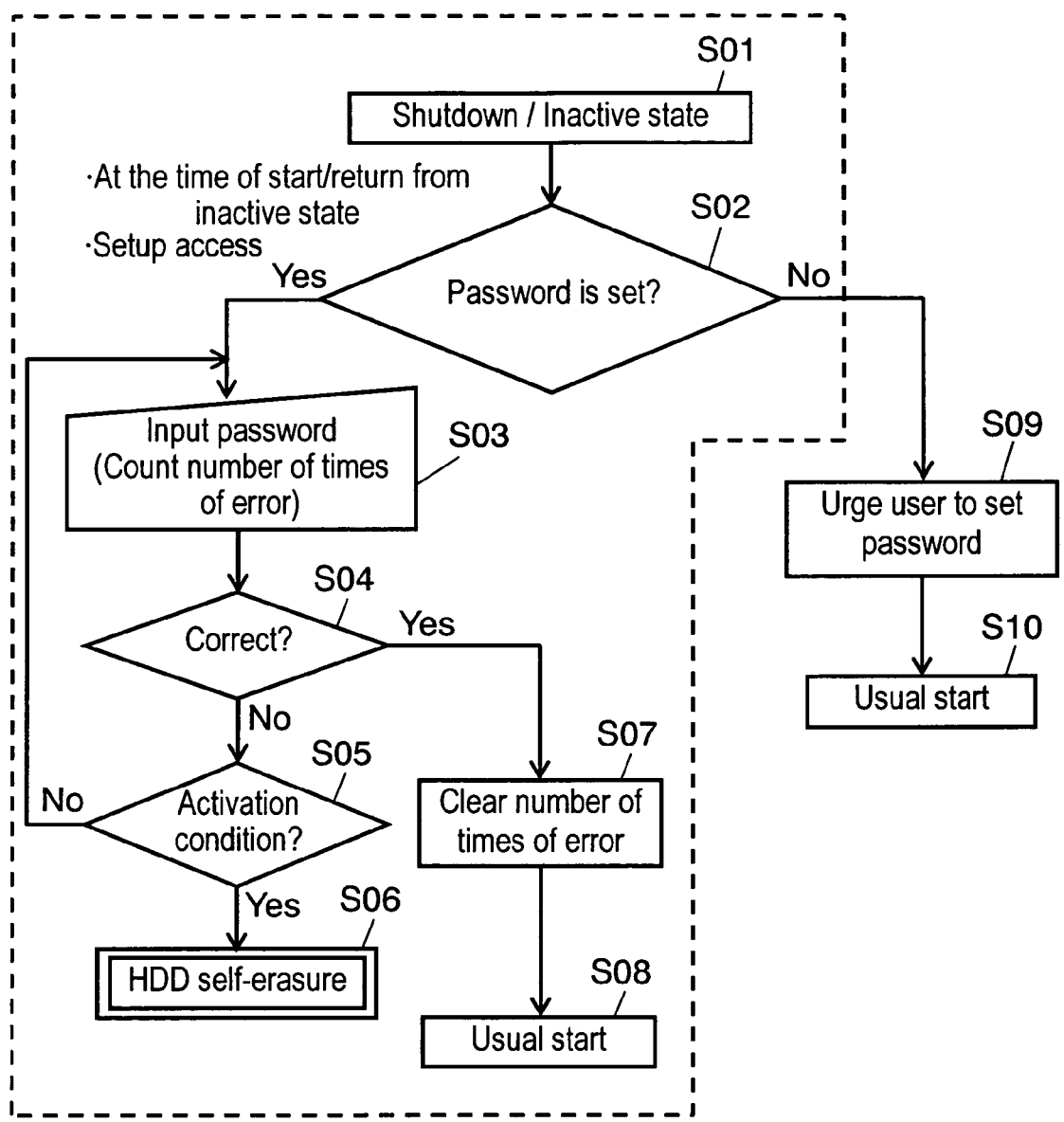
FIG. 3 is a flowchart of an illegal access prevention method for an information processing apparatus in a second embodiment of the invention.

FIG. 3 is a flowchart concerning an illegal access prevention method for an information processing apparatus in a second embodiment of the invention. The illegal access prevention method for an information processing apparatus in this embodiment will be hereinafter explained with reference to FIG. 3.

When a PC is started from a shutdown or inactive state (S01), it judges whether a password is set (S02), and, if a password is set, urges a user to input a password (S03). The PC judges whether the password is correct (S04) and, when an incorrect password is inputted, judges whether a security activation condition is satisfied (S05). When wrong passwords are continuously inputted for a predetermined number of times, the PC rewrites an MBR of an HDD according to judgment that the security activation condition is satisfied, sets a self-erasing program in the MBR, activates an HDD self-erasing function, and starts erasure of all programs and data in the HDD (S06).

Once entering this step in S06, even if a power supply is turned off during erasure, the PC always starts a self-erasing program from the HDD and continues the erasure of the HDD next time. In that case, the PC also controls start from other devices such as an FDD and use of user interfaces. Since the user interfaces are also controlled, that is, made unusable, it is impossible to enter BIOS setup and operate a start order. When wrong password input has not reached the predetermined number of times in S05, as shown in FIG. 2B, the PC urges the user to input a correct password again.

When a correct password is inputted within the predetermined number of times, the PC clears a content of count of the number of times of error (S07), performs usual start, and starts an OS (S08). When the PC judges that a password is not set (S02), the PC urges the user to set a password for a security purpose (S09) and shifts to the usual start (S10). A part surrounded by a broken line in FIG. 3 indicates the illegal access prevention method for an information processing apparatus in this embodiment.

In this way, when it is judged that an illegal access to the PC is performed from wrong input of a password, self-erasure activation of the HDD is performed to erase all the programs and the data in the HDD. Consequently, security is intensified and it is possible to make prevention of data leakage from a recording medium such as the HDD stronger.

Third Embodiment

A hardware configuration of an information processing apparatus in a third embodiment of the invention is the same as that shown in FIG. 1. In FIG. 1, RTC 112 is built in south bridge 104 and operated by coin battery 110 in the same manner as CMOS memory 109. Thus, even if the power supply is turned off, RTC 112 can tick away time such as year, day, hour, minute, and second. Moreover, it is also possible to cause CMOS memory 109 serving as the second recording medium to hold time when the PC ends. The other parts of the constitution are the same as those in the first embodiment.

An operation of illegal access prevention of the PC serving as the information processing apparatus constituted as described above will be explained with reference to FIG. 1.

If a password set in a stolen PC, in general, it is difficult to decode the password and use the PC. Then, in a state of mind of a thief, transfer, resale, and neglect are possible as the next act that the thief takes. In any case, the thief cannot start the OS unless the thief can learn the password. Thus, at the time of OS end processing of the PC, an end time (year, day, hour, minute, and second) of the OS end processing is recorded. When the PC continues to be unused for a few days, a few weeks, a few months, or a few years and is started again, if the time during which the PC has not been used exceeds a predetermined time, it is judged that the PC has been stolen.

As in the first embodiment, according to judgment that the security activation condition is satisfied, the PC rewrites MBR 111 of HDD 106, sets the self-erasing program in MBR 111, activates the self-erasing function of HDD 106, and starts erasure of all the programs and the data in HDD 106. Even if the PC is not stolen, when the PC has not been used for a long time, there is little problem in erasing the programs and the data in HDD 106 judging that the programs and the data are not useful. The PC administrator may be able to change setting of validity/invalidity of the self-erasing function itself of the HDD according to the predetermined time or the time during which the PC is not used.

Figure 4:
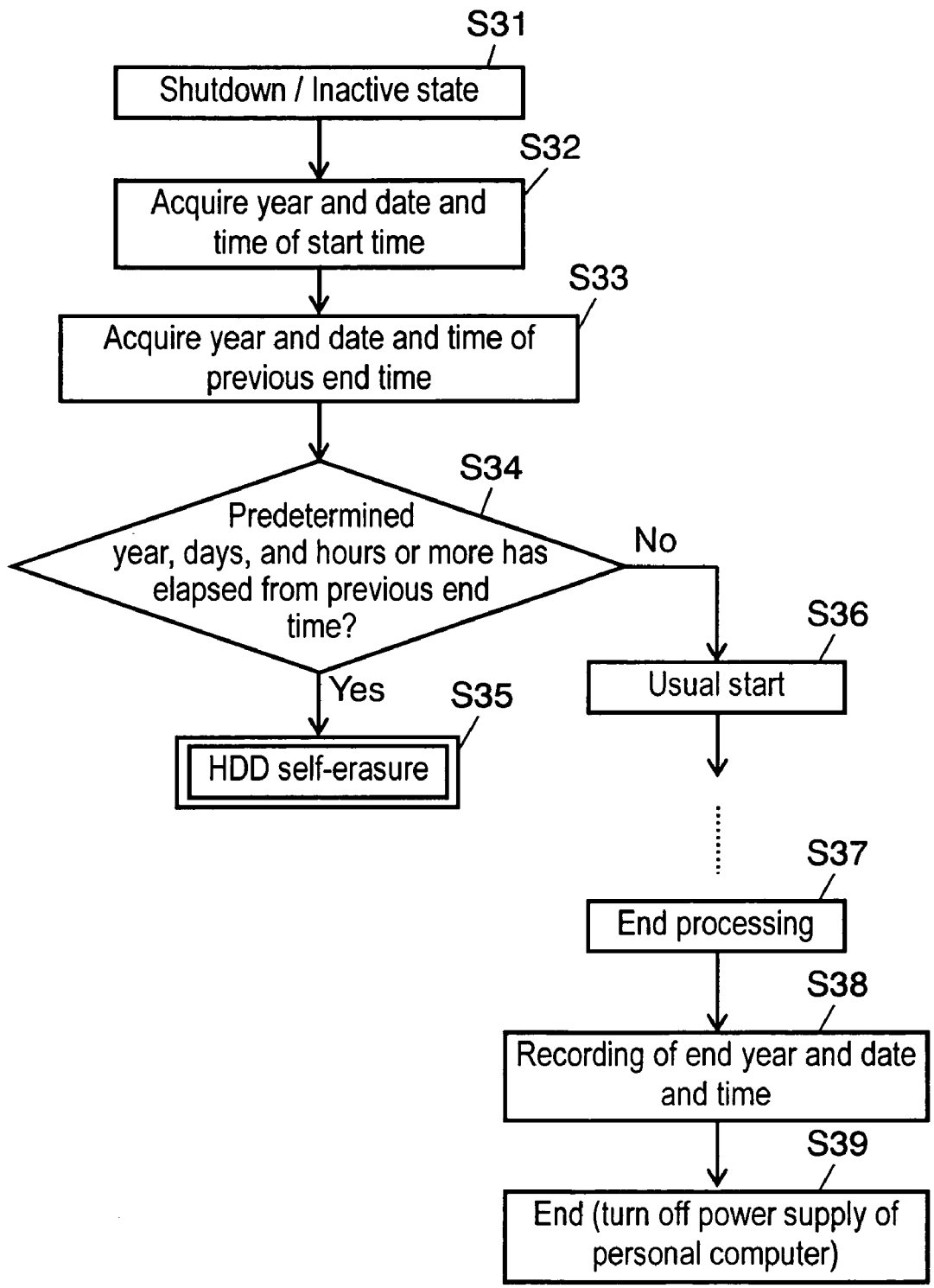
FIG. 4 is a flowchart of an illegal access prevention method for an information processing apparatus in a third embodiment of the invention.

FIG. 4 is a flowchart of the illegal access prevention method for an information processing apparatus in this embodiment. The illegal access prevention method for an information processing apparatus of the invention will be hereinafter explained with reference to FIG. 4.

When the PC is started from a shutdown or inactive state (S31) and acquires a start time of the PC from RTC 112 (S32). Subsequently, the PC reads out time when the PC is ended last time from CMOS memory 109 and acquires the time (S33) and judges whether a predetermined time (years and days) has elapsed from the last end time (S34). If the predetermined time or more has elapsed, the PC judges that the security activation condition is satisfied and starts erasure of all the programs and the data in the HDD (S35). If the predetermined time has not elapsed, the PC performs a usual start operation (S36). When the function in the second embodiment is also used, the PC executes the steps in FIG. 3 from S03. When the PC is started correctly and end processing is performed (S37), the PC records an end date and time (S38) and ends the processing (S39).

In this way, when the PC has not been used for a fixed period, since it is judged that the PC is stolen, the self-erasure activation of the HDD is performed to erase all the programs and the data in the HDD. Thus, security is intensified and it is possible to make prevention of data leakage from the recording medium such as the HDD stronger.

Fourth Embodiment

An illegal access prevention method for an information processing apparatus in a fourth embodiment of the invention will be explained with reference to FIG. 5. It is still possible to remove an HDD from a PC serving as an information processing apparatus, attach the HDD to a PC or another apparatus that is different from the PC in which the HDD has been set, and illegally read out data recorded in the HDD.

Figure 5:
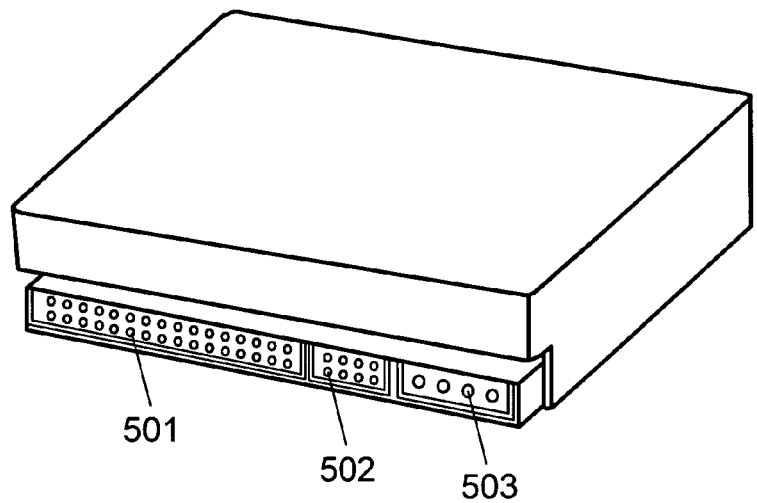
FIG. 5 is a diagram showing an example of a connection terminal face of an HDD of an information processing apparatus in a fourth embodiment of the invention.
Figure 6:
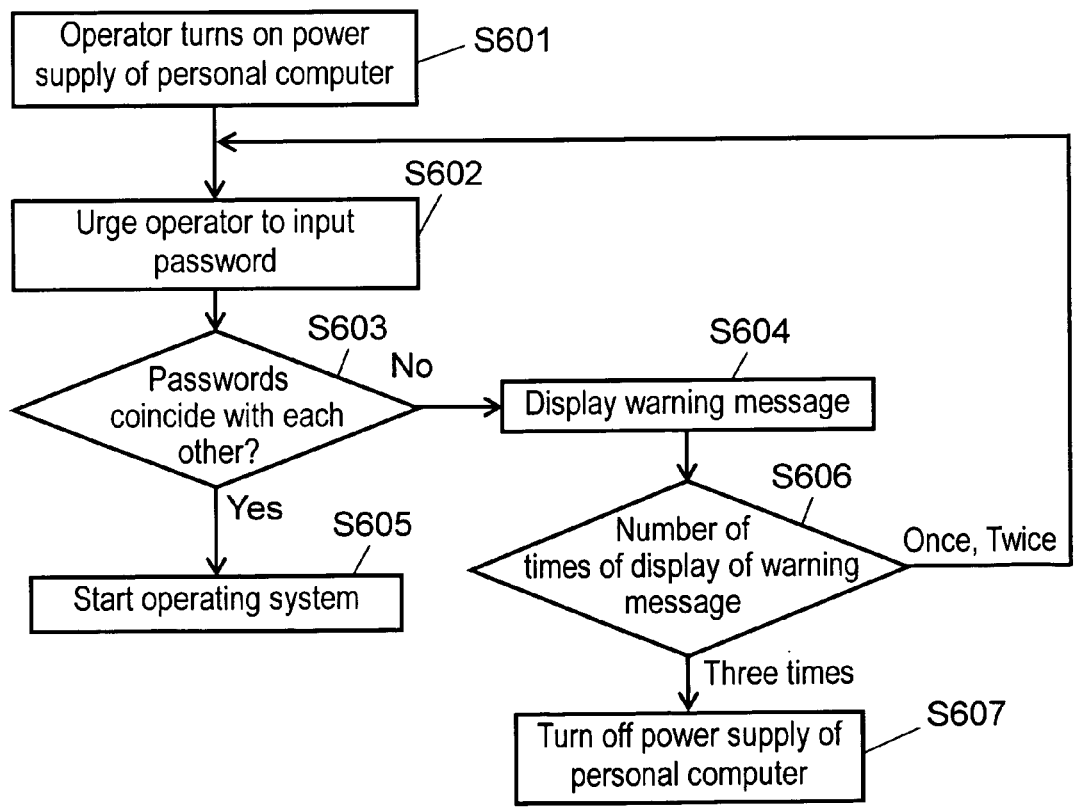
FIG. 6 is a flowchart of an illegal access prevention method in a conventional information processing apparatus.

FIG. 5 is a diagram showing an example of a connection terminal face of the HDD of the information processing apparatus in this embodiment. ATA (IDE) terminals 501, jumper terminals for setting 502, and power supply terminals 503 to which a power supply connector is connected are shown in the figure. Concerning ATA (IDE) terminals 501, in recent years, a new standard such as a serial ATA has been spread and many ATA terminals do not take a form shown in FIG. 5.

In the HDD shown in FIG. 5, it is assumed that a user supplies power from power supply terminals 503 to the HDD and attempts to illegally read out a program and data from ATA terminals 501. This case will be explained. Once the HDD enters a self-erasing mode, even if the user uses a PC or another apparatus different from the PC in which the HDD has been set to supply power from power supply terminals 503 to the HDD, at this point, the HDD is capable of independently executing a self-erasing program to self-erase the program and the data recorded. System construction described below is performed to realize this function.

(a) The self-erasing program is mounted on a program of a microcomputer (not shown), that is, firmware, constituting a part of a control circuit section in the HDD.
(b) The microcomputer of the HDD receives a command to shift to the self-erasing mode from a BIOS because of an illegal access. This command is stored in a part of a flash memory (not shown) storing the firmware or an unused area on a magnetic disk (not shown) of the HDD. When the unused area of the HDD is used, the area needs to be an area that cannot be rewritten by a general OS, data, or program.
(c) In the self-erasing mode, a self-erasing program on the firmware is forcibly executed simultaneously with supply of power to the HDD to self-erase the program and the data recorded in the HDD.

By constructing such a system, even if the user attempts to remove the HDD from the PC and attaches the HDD to a PC or another apparatus different from the PC in which the HDD has been set to illegally read out data recorded in the HDD, once the HDD enters the self-erasing mode, the HDD independently executes the self-erasing program. This makes it possible to make prevention of data leakage from a recording medium such as the HDD due to an illegal access stronger.

As described in the first to the fourth embodiments, in the invention, at a stage when the information processing apparatus is started, the information processing apparatus prevents an illegal access by using a password and, when a condition set in advance is satisfied, self-erases programs and data in the HDD serving as the first recording medium. Once the self-erasing program in the HDD is activated, even if a power supply is turned off during erasure of the data in the HDD, the information processing apparatus always starts the self-erasing program from the HDD to continue erasure of the data in the HDD. In that case, the information processing apparatus also controls start from other devices such as an FDD and use of user interfaces. Since the user interfaces are also controlled, that is, made unusable, it is impossible to enter BIOS setup and operate a start order. This makes it possible to make prevention of data leakage from a recording medium such as the HDD due to an illegal access stronger.

The information processing apparatus having an illegal access prevention function and the illegal access prevention method according to the invention erase all programs and data in a recording medium. Thus, security is reinforced. This makes it possible to make prevention of data leakage from a recording medium such as an HDD due to an illegal access stronger. The information processing apparatus having an illegal access prevention function and the illegal access prevention method are suitable as an information processing apparatus such as a personal computer having an illegal access prevention function and an illegal access prevention method for the information processing apparatus.

What is claimed is:

1. An information processing apparatus, comprising:
    a first recording medium that is capable of recording programs and data;
    a password input unit to which a password is inputted;
    a password judging unit that judges whether a password inputted to the password input unit and a password stored in advance coincide with each other;
    a condition judging unit that judges, when the apparatus is started, whether a condition set in advance is satisfied,
    wherein, when the condition judging unit judges that the condition set in advance is satisfied, the information processing apparatus sets a self-erasing program in the first recording medium and the first recording medium self-erases programs and data recorded in the first recording medium according to the self-erasing program,
    a clock that outputs time data; and
    a second recording medium that records an operation end time of the apparatus obtained by using the clock,
    wherein the condition set in advance is a condition that a time difference between a start time when the apparatus is started and a previous operation end time recorded in the second recording medium exceeds a predetermined time.

2. An information processing apparatus of claim 1, wherein the self-erasing program once set in the first recording medium is constituted to be nonvolatile, and, even if an erasing operation of the self-erasing program is forcibly suspended, the self-erasing program is executed again when the apparatus is started next time.

3. An illegal access prevention method for an information processing apparatus including a first recording medium capable of recording programs and data, the illegal access prevention method comprising:

a password input step of requesting a user to input a password;

a password judging step of judging whether a password inputted in the password input step and a password stored in advance coincide with each other;

a condition judging step of judging, when the information processing apparatus is started, whether a condition set in advance is satisfied;

a self-erasing step of setting, when it is judged in the condition judging step that the condition set in advance is satisfied, a self-erasing program in the first recording medium and self-erasing programs and data recorded in the first recording medium according to the self-erasing program, a time data output step of outputting time data; and an operation end time recording step of recording an operation end time of the information processing apparatus obtained in the time data output step, wherein the condition set in advance is a condition that a time difference between time outputted in the time data output step when the information processing apparatus is started and a previous operation end time recorded in the second recording medium in the operation end time recording step exceeds a predetermined time.

4. An illegal access prevention method of claim 3, wherein the self-erasing program once set in the self-erasing step is constituted to be nonvolatile, and, even if an erasing operation of the self-erasing program is forcibly suspended, the self-erasing program is executed again when the information processing apparatus is started next time.

* * * * *